United States Patent [19]

Alexander et al.

[11] Patent Number: 4,670,815

[45] Date of Patent: Jun. 2, 1987

[54] DIELECTRIC COMPOSITION

[75] Inventors: John H. Alexander, Bishop's Stortford; Dawn A. Jackson, Old Harlow, both of England

[73] Assignee: STC PLC, London, England

[21] Appl. No.: 892,801

[22] Filed: Aug. 1, 1986

[30] Foreign Application Priority Data

Aug. 14, 1985 [GB] United Kingdom ................. 8520346

[51] Int. Cl.⁴ .......................... H01G 4/12; H01G 7/00; C04B 35/46
[52] U.S. Cl. ..................................... 361/321; 252/521; 501/136
[58] Field of Search ....................... 361/320, 321, 328; 252/62.38 T, 62.3 R, 521; 501/134, 135, 136; 29/25.42

[56] References Cited

U.S. PATENT DOCUMENTS

| | | | |
|---|---|---|---|
| 3,913,201 | 10/1975 | Schreiner et al. | 252/521 X |
| 4,216,102 | 8/1980 | Furukawa et al. | 501/134 X |
| 4,482,935 | 11/1984 | Wheeler | 501/136 X |
| 4,525,768 | 6/1985 | Wheeler | 252/521 X |
| 4,536,821 | 8/1985 | Wheeler et al. | 29/25.42 X |
| 4,542,107 | 9/1985 | Kato et al. | 361/321 X |

*Primary Examiner*—Donald A. Griffin
*Attorney, Agent, or Firm*—Lee, Smith & Zickert

[57] ABSTRACT

A dielectric composition including a ternary system comprising non-stoichiometric lead magnesium niobate, non-stoichiometric lead zinc niobate and non-stoichiometric lead iron niobate, and a small amount of one or more oxide additives which serves to reduce the tan $\delta$ value in comparison with the ternary system alone. The one or more additives may be chosen from the group consisting of nickel oxide, stoichiometric lead nickel niobate, ceric oxide, lead oxide, zirconium oxide, silver oxide, manganese dioxide, lanthanum oxide and cobalt oxide. Compositions with firing temperatures in the range 950° to 1100° C. have dielectric constants in the range 10700 to 16600 (at 20° C.) making the composition particularly useful for high silver content multilayer ceramic capacitors.

8 Claims, No Drawings

DIELECTRIC COMPOSITION

BACKGROUND OF THE INVENTION

1. Field of the Invention

This invention relates to dielectric compositions for use, for example, in ceramic capacitors in particular, but not exclusively, multilayer ceramic capacitors.

2. Description of the Prior Art

A multilayer ceramic capacitor basically comprises a stack consisting of a plurality of dielectric members formed of a ceramic material, with electrodes positioned between the members. The electrodes may be screen-printed onto the ceramic material, in the unfired state thereof, using conductive inks. A stack of screen-printed dielectric members is assembled, pressed together, cut into individual components, if appropriate, and fired until sintering occurs, in order to ensure non-porosity.

With the originally employed dielectrics the capacitors had to be fired at temperatures of the order of 1200°–1400° C., which meant that the internal electrodes had to be of a suitable material to withstand such temperatures and that, therefore, expensive noble metals, such as platinum or palladium, had to be used. However, by suitable choice of the dielectric it is possible to reduce the firing temperature thus enabling the use of internal electrodes with a high silver content (50–100% silver), which reduces the cost of materials and manufacture. A dielectric composition which can be fired at a temperature between 950° and 1100° C. and can thus be used with high silver content internal electrodes is, disclosed in our U.S. Pat. No. 4,482,935 issued Nov. 13, 1984. The compositions disclosed therein comprise non-stoichiometric lead magnesium niobate ($PbMg_{\frac{1}{2}}Nb_{\frac{1}{2}}O_3$) with one or more of the following, namely lead titanate, lead stannate, lead zirconate. Some of the compositions have dielectric constants in the range 7500–10000 which makes them particularly suitable for multilayer ceramic capacitors. The originally employed ceramics (U.S. coding Z5U) were not compatible with high silver content electrodes and usually had dielectric constants lower than 7500–10,000.

The electronics industry generally requires smaller components and smaller and cheaper capacitors can be obtained by producing dielectrics which are compatible with high silver content electrodes and have even higher dielectric constants than these with the 7500–10000 range mentioned above. One such composition is disclosed in our U.S. Pat. No. 4,525,768 issued June 25, 1985 and comprises non-stoichiometric lead magnesium niobate, non-stoichiometric lead iron niobate and one or more oxide additives, which may be chosen from silica, manganese dioxide, ceric oxide, lanthanum oxide, zinc oxide, alumina, tungsten oxide, nickel oxide, cobalt oxide and cuprous oxide. Additionally lead titanate may be included. If, for example, three or more oxide additives are chosen from the first eight of the ten mentioned above, compositions having firing temperatures between 900° and 1075° C. may be obtained, the dielectric constants after firing being in the range 10,600 to 16,800 making them particularly suitable for small multilayer ceramic capacitors.

In our further U.S. Pat. No. 4,536,821 issued Aug. 20, 1985 there is disclosed a dielectric composition based on non-stoichiometric lead magnesium niobate together with lead zinc niobate. This dielectric composition may also include one or more simple oxide additives chosen from silica, manganese dioxide, zinc oxide, nickel oxide, alumina, ceric oxide, lanthanum oxide, tungsten oxide, gallium oxide, titanium dioxide and lead oxide. One or more of the following may also be added to the basic composition, bismuth stannate, bismuth titanate, lead stannate, lead zirconate and lead titanate with or without a simple oxide additive. Such compositions fire at temperatures between 980° and 1075° C. and have dielectric constants at 25° C. in the range 9000 to 16,300 with Z5U temperature dependence characteristics and low tan δ (%) (dielectric loss) at 25° C.

It should be noted that the lead magnesium niobate employed in the above dielectric compositions is non-stoichiometric and is not the conventional stoichiometric $PbMg_{\frac{1}{3}}Nb_{\frac{2}{3}}O_3$. In some of the specifications referred to above the expression $PbMg_{\frac{1}{2}}Nb_{\frac{1}{2}}O_3$ is employed to distinguish from the conventional $PbMg_{\frac{1}{3}}Nb_{\frac{2}{3}}O_3$. The material employed for the results quoted in the above specifications is in fact $PbMg_{0.443}Nb_{0.5001}O_3$ which approximates to $PbMg_{\frac{1}{2}}Nb_{\frac{1}{2}}O_3$. Preferably the magnesium was in the range 0.35 to 0.5 and the niobium was in the range 0.4 to 0.6 and thus the lead magnesium niobate was non-stoichiometric. The expression lead zinc niobate is conventionally understood to mean $PbZn_{\frac{1}{3}}Nb_{\frac{2}{3}}O_3$, however non-stoichiometric versions are also possible and that used in U.S. Pat. No. 4,536,821 was defined as $PbZn_{0.3 \text{ to } 0.5}Nb_{0.6 \text{ to } 0.7}O_3$.

In our co-pending U.S. patent application Ser. No. 706,790 now U.S. Pat. No. 4,625,258 issued Nov. 25, 1984 there is disclosed a ternary system dielectric composition comprising a mixture of non-stoichiometric lead magnesium niobate, non-stoichiometric lead zinc niobate and non-stoichiometric lead iron niobate, with or without lead oxide PbO as an addition at up to the 10wt % level, for example 5wt %. The lead oxide appeared to widen the firing range and gave dielectrics with useful properties at low firing temperatures, for example 950° C. Some of the compositions disclosed in this further application had temperature coefficients of capacitance in the Z5U range, namely between 10° C. and 85° C. the capacitance variation remains within the band +22% to −56% of the 25° C. value. Others of the compositions fell in the Y5V range, namely between −30° C. and 85° C., the capacitance variation remains within the band +22% to −82% of the 25° C. value. Firing temperatures down to 900° C. are possible with some compositions.

BRIEF SUMMARY OF THE INVENTION

It is an object of the present invention to provide alternative dielectric compositions based on the above referred to ternary system with further improved properties, in particular reduced tan δ.

According to one aspect of the present invention there is provided a dielectric composition including a ternary system comprising non-stoichiometric lead magnesium niobate, non-stoichiometric lead zinc niobate, non-stoichiometric lead iron niobate, and a small amount of one or more additives which serves to reduce the tan δ value in comparison with the ternary system alone.

According to a further aspect of the present invention there is provided a ceramic capacitor including dielectric fired at a temperature between 950° C. and 1100° C. and including a ternary system comprising non-stoichiometric lead magnesium niobate, non-stoichiometric lead zinc niobate and non-stoichiometric lead iron niobate, and a small amount of one or more additives which serves to reduce the tan δ value of the ternary system.

The ternary system may comprise 50 to 80wt % non-stoichiometric lead magnesium niobate, 10 to 35 wt % non-stoichiometric lead zinc niobate and 5 to 30wt % non-stoichiometric lead iron niobate. The additive(s) may be chosen from the group consisting of nickel oxide, stoichiometric lead nickel niobate, ceric oxide, lead oxide, zirconium oxide, silver oxide, manganese dioxide, lanthanum oxide and cobalt oxide.

DESCRIPTION OF THE PREFERRED EMBODIMENTS

The dielectric compositions proposed in the present application are based on the ternary system comprising a mixture of non-stoichiometric lead magnesium niobate (LMN), non-stoichiometric lead zinc niobate (LZN) and non-stoichiometric lead iron niobate (LIN) with the addition of small amounts of oxides in particular, simple oxides, either singly or in composition, to provide in particular, but not exclusively, a Y5V relaxor dielectric. By relaxor is meant that the dielectric constant decreases with increasing frequency, that is the dielectric constant "relaxes", and by Y5V is meant Y5V temperature coefficient of capacitance. Preferably the LMN is $PbMg_{0.35 \text{ to } 0.5}Nb_{0.4 \text{ to } 0.6}O_3$, the LZN is $PbZn_{0.3 \text{ to } 0.5}Nb_{0.6 \text{ to } 0.7}O_3$ and the LIN is $PbFe_{0.25 \text{ to } 0.45}Nb_{0.40 \text{ to } 0.55}O_3$. Typically the basic ternary system comprises between 50 and 80wt % LMN, between 10 to 35wt % LZN and between 5 and 30wt % LIN. In the following table measured electric parameters are quoted for the basic ternary system (Base) comprising 65wt % LMN, 27.5wt % LZN and 7.5wt % LIN prepared by a method comprising first separately preparing LMN, LZN and LIN The LMN was prepared by first reacting MgO and $Nb_2O_5$ together at 1050° C. and then mixing with PbO and calcining at 600° to 850° C. The LZN was prepared by reacting together PbO, ZnO and $Nb_2O_5$ at 600° to 700° C. The LIN was prepared by reacting together, PbO, $Fe_2O_3$ and $Nb_2O_5$ at 900° to 1100° C. The LMN, LZN and LIN were then mixed together and the mixture subjected to a final calcining stage at 600° to 850° C. Oxide additives were included as indicated. The compositions were dried, pressed into disc shapes and the examples quoted were fired for times between one and two hours at temperatures between 950° and 1050° C., although firing up to 1100° C. is alternatively possible. Aluminium electrodes were suitably evaporated onto a surface thereof to enable the electrical parameters quoted to be measured. The table gives the maximum temperature dependence (%) of the dielectric constant over the range −30° to 85° C. with respect to that at 25° C., $K_{max}$ the maximum value of dielectric constant, $T_{kmax}$ the temperature at which the dielectric constant is a maximum; the dielectric constant at 20° and 25° C. ($K_{20°C}$, $K_{25°C}$) and the dielectric loss (tan δ) at 20° and 25° C. In the table the small amount of oxide additive is either 0.1 or 1.0wt %, by the expression small amount is to be understood up to 5 wt %. By LNN is meant the relaxor compound stoichiometric lead nickel niobate $PbNi_{\frac{1}{3}}Nb_{\frac{2}{3}}O_3$.

As can be appreciated from the results quoted in the table the addition of these small quantities of oxides or other relaxor compounds such as LNN generally has the effect of reducing tan δ in comparison with that of the base ternary composition alone, although there are exceptions, without significantly affecting the dielectric constant. The addition of 0.1 wt % $MnO_2$ while producing the lowest tan δ results does reduce the dielectric constant significantly but it is still high in comparison with some conventional dielectrics and of comparable value to some of these disclosed in our abovementioned specifications. The temperature coefficient of capacitance is largely unchanged and remains within the Y5V range.

In addition to the additives quoted in the table others such as $La_2O_3$ and CoO may be employed. Whereas the results are quoted for the addition of only one additive, combinations of additives may similarly be employed. For example if one additive, such as NiO, serves to reduce tan δ values, and another additive, such as LNN, serves also to reduce tan δ values, then a combination of these two in appropriate amounts will have the same effect.

|  | Temp. dep. of K(ΔC −30 to +85° C. ref. temp. 25° C.) | | $K_{MAX}$ (,000) | $T_{KMAX}$ °C. | $K_{20°C}$ (,000) | $K_{25°C}$ (,000) | tan $δ_{20°C}$ % | tan $δ_{25°C}$ % |
|---|---|---|---|---|---|---|---|---|
|  | + % | − % |  |  |  |  |  |  |
| Base | 7.3 | 62.3 | 16.0 | 16 | 15.6 | 14.8 | 3.0 | 1.2 |
| Base + 0.1% NiO | 10.6 | 62.5 | 15.2 | 15 | 14.6 | 13.7 | 3.0 | 1.8 |
| Base + 1.0% NiO | 15.5 | 56.8 | 14.2 | 4 to 5 | 12.4 | 11.9 | 0.8 | 0.6 |
| Base + 0.1% LNN | 7.2 | 61.8 | 16.1 | 15 | 15.6 | 15.0 | 1.8 | 1.2 |
| Base + 1.0% LNN | 17.6 | 57.1 | 14.6 | 2 to 5 | 12.6 | 12.0 | 2.0 | 0.7 |
| Base + 0.1% $CeO_2$ | 8.5 | 71.5 | 14.0 | 14 | 13.5 | 12.9 | 1.4 | 0.9 |
| Base + 1.0% $CeO_2$ | 7.6 | 54.7 | 12.9 | 12 to 15 | 12.6 | 12.0 | 1.2 | 0.8 |
| Base + 0.1% PbO | 6.3 | 63.8 | 16.7 | 15 to 16 | 16.4 | 15.7 | 2.0 | 1.2 |
| Base + 1.0% PbO | 6.6 | 62.8 | 16.8 | 14 to 16 | 16.6 | 15.9 | 1.8 | 1.1 |
| Base + 0.1% $ZrO_2$ | 8.0 | 61.4 | 16.6 | 14 to 15 | 16.0 | 15.3 | 1.6 | 0.9 |
| Base + 1.0% $ZrO_2$ | 2.7 | 64.7 | 14.8 | 17 to 18 | 14.8 | 14.5 | 2.8 | 1.5 |
| Base + 0.1% $Ag_2O$ | 10.0 | 59.6 | 16.5 | 14 | 15.8 | 15.0 | 1.5 | 0.9 |
| Base + 1.0% $Ag_2O$ | 11.2 | 58.5 | 16.2 | 12 to 13 | 15.4 | 14.6 | 3.1 | 1.1 |
| Base + 0.1% $MnO_2$ | 7.4 | 50.5 | 11.2 | 10 | 10.7 | 10.4 | 0.7 | 0.5 |

A method of manufacturing a multilayer ceramic capacitor using the dielectric compositions described above may comprise the steps of screen printing a plurality of electrodes on each of a plurality of unfired dielectric sheets with high silver content ink; assembling a stack of such printed sheets with the electrodes of alternate layers arranged relative to one another as appropriate to the particular construction employed, for example sideways stepped or overlapping crosswise; pressing the sheets together with extra blank sheets applied to the top and bottom of the stack to give an adequate voltage margin, if required; cutting the sheets to form individual capacitor components and firing the individual components at a temperature between 950° and 1100° C. Subsequently the electrodes between every other sheet may be conventionally connected by the appropriate application of conductive paint, for example, to opposite side faces of the stack.

TECHNICAL ADVANTAGES OF THE INVENTION

By the addition of small amounts of other relaxor compounds or oxides to the basic ternary system there are provided low firing temperature ceramic dielectrics with very high dielectric constant (K), low tan δ and Y5V temperature coefficient of capacitance characteristics.

We claim:

1. A dielectric composition including a ternary system comprising non-stoichiometric lead magnesium niobate, non-stoichiometric lead zinc niobate, non-stoichiometric lead iron niobate, and a small amount of one or more additives which serves to reduce the tan δ value in comparison with the ternary system alone.

2. A dielectric composition as claimed in claim 1 wherein the ternary system comprises between 50 and 80 wt % non-stoichiometric lead magnesium niobate, between 10 and 35 wt % non-stoichiometric lead zinc niobate and between 5 and 30 wt % non-stoichiometric lead iron niobate.

3. A dielectric composition as claimed in claim 1 wherein the one or more additives are chosen from the group consisting of nickel oxide, stoichiometric lead nickel niobate, ceric oxide, lead oxide, zirconium oxide, silver oxide, manganese dioxide, lanthanum oxide and cobalt oxide.

4. A dielectric composition as claimed in claim 1, wherein the one or more additives are added at the 0.1 wt % level.

5. A dielectric composition as claimed in claim 1. wherein the one or more additives are added at the 1.0 wt % level.

6. A dielectric composition as claimed in claim 1 and whose constituents are as indicated in one of the examples quoted in the Table.

7. A ceramic capacitor including dielectric fired at a temperature between 950° and 1100° C. and including a ternary system comprising non-stoichiometric lead magnesium niobate, non-stoichiometric lead zinc niobate and non-stoichiometric lead iron niobate, and a small amount of one or more additives which serves to reduce the tan δ value of the ternary system.

8. A ceramic capacitor as claimed in claim 7 wherein the one or more additives are chosen from the group consisting of nickel oxide, stoichiometric lead nickel niobate, ceric oxide, lead oxide, zirconium oxide, silver oxide, manganese dioxide, lanthanum oxide and cobalt oxide.

* * * * *